United States Patent
Fujii

(10) Patent No.: US 8,193,263 B2
(45) Date of Patent: Jun. 5, 2012

(54) FLAME-RETARDANT GLASS FIBER-REINFORCED POLYAMIDE RESIN COMPOSITION

(75) Inventor: Shigeta Fujii, Uji (JP)

(73) Assignee: Unitika Ltd., Amagasaki-Shi, Hyogo (JP)

( * ) Notice: Subject to any disclaimer, the term of this patent is extended or adjusted under 35 U.S.C. 154(b) by 0 days.

(21) Appl. No.: 12/676,760

(22) PCT Filed: Sep. 2, 2008

(86) PCT No.: PCT/JP2008/065730
§ 371 (c)(1),
(2), (4) Date: Mar. 5, 2010

(87) PCT Pub. No.: WO2009/031521
PCT Pub. Date: Mar. 12, 2009

(65) Prior Publication Data
US 2010/0227957 A1    Sep. 9, 2010

(30) Foreign Application Priority Data
Sep. 7, 2007 (JP) .................. 2007-233065

(51) Int. Cl.
*C08K 5/5313* (2006.01)
(52) U.S. Cl. ................... 524/126; 524/133
(58) Field of Classification Search ........... 524/126, 524/133
See application file for complete search history.

(56) References Cited

U.S. PATENT DOCUMENTS

| | | | |
|---|---|---|---|
| 4,759,784 A | 7/1988 | Shono et al. | |
| 2003/0162871 A1* | 8/2003 | Saito | 524/148 |
| 2004/0227130 A1 | 11/2004 | Hoerold et al. | |
| 2009/0062452 A1* | 3/2009 | Harder et al. | 524/494 |

FOREIGN PATENT DOCUMENTS

| | | |
|---|---|---|
| CN | 101372555 A | 2/2009 |
| EP | 1 988 126 A1 | 11/2008 |
| JP | 61-174141 A | 8/1986 |
| JP | 3-126763 A | 5/1991 |
| JP | 5-105812 A | 4/1993 |
| JP | 2004-263188 A | 9/2004 |
| JP | 2004-300188 A | 10/2004 |
| JP | 2005-350501 A | 12/2005 |
| JP | 2006-342278 A | 12/2006 |
| JP | 2007-23206 A | 2/2007 |
| WO | WO-2007/097214 A1 | 8/2007 |

OTHER PUBLICATIONS

English translation of International Preliminary Report on Patentability (Form PCT/IB/338 and 373) and of Written Opinion of International Searching Authority (Form PCT/IB/237) mailed on Apr. 8, 2010 in PCT/JP2008/065730.
Korean Office Action, dated Nov. 7, 2011, for Korean Application No. 10-2010-7007489, including English translation.
Chinese First Office Action dated Dec. 7, 2011 for the Chinese Application No. 200880105994.6.

* cited by examiner

*Primary Examiner* — Peter Szekely
(74) *Attorney, Agent, or Firm* — Birch, Stewart, Kolasch & Birch, LLP

(57) ABSTRACT

A flame-retardant glass fiber-reinforced polyamide resin composition, containing:
  100 parts by mass of a flame-retardant resin composition consisting of
    (A) 60 to 90 percent by mass of a polyamide resin, and
    (B) 40 to 10 percent by mass of a flame retardant containing no halogen atom,
    (A)+(B) being 100 percent by mass; and
  60 to 210 parts by mass of a flattened glass fiber (C) having a flat section of 1.5-10 in a ratio of major axis/minor axis,
  wherein the polyamide resin (A) contains a crystalline polyamide resin (a1) and an amorphous polyamide resin (a2),
  the flame retardant containing no halogen atom (B) contains a phosphinate (b1) and/or a diphosphinate (b2), and
  a blending ratio of the amorphous polyamide resin (a2) in the polyamide resin (A) is $0.1 \leq (a2)/(A) \leq 0.5$.

12 Claims, No Drawings

FLAME-RETARDANT GLASS FIBER-REINFORCED POLYAMIDE RESIN COMPOSITION

TECHNICAL FIELD

The present invention relates to a resin composition that gives moldings significantly high in rigidity, superior in surface smoothness and appearance and extremely high in flame retardancy, generates no highly corrosive halogen-based and other gases during combustion and is superior in running properties at extrusion and also in moldability, in particular, to a flame-retardant reinforced polyamide resin composition that is used favorably as a material for parts such as those used in electric and electronic fields and electric parts in automobile field and also as a material for housing of electrical devices including OA devices, such as portable personal computer, word processor, electronic dictionary and cellphone, that demand favorable appearance.

BACKGROUND ART

Polyamide resins, which are superior for example in mechanical properties and heat resistance, have been used widely in various fields such as of electric and electronic devices, automobile, machinery, construction material and others. Recently, in the tread toward substitution of metal with resin, there is an increasing demand for a resin material having the strength and rigidity equivalent to those of metal materials. In particular, a high level of flame retardancy is required to electrical components such as connectors and home appliances including housing materials for electrical apparatuses presented by OA devices such as portable personal computer, word processor, electronic dictionary and cellphone. Generally, a method of adding a halogen- or triazine-based flame retardant or a method of depositing Mg on resin has been used to make the resin flame-retardant. Unfavorably, halogen-based flame retardants are considered to have adverse effects on environment and human, for example with the highly corrosive halogen-based gases and hazardous substances generated during combustion, and thus there is a movement toward restriction on use of the halogen-based flame retardants.

Accordingly, halogen-free triazine-based flame retardants attracted attention and there are many studies on these retardants. It is possible for moldings containing no reinforcing material to satisfy the requirements in flame retardancy corresponding to the UL94 V-0 specification at a thickness of 1/32 inch, but unfavorably, it is not possible for moldings reinforced with glass fiber or the like, to satisfy the UL94 V-0 specification because of cotton ignition, even if a flame retardant is blended in a great amount.

On the other hand, a flame-retarding method of using an intumescent flame retardant such as melamine phosphate, melamine pyrophosphate or melamine polyphosphate in a glass fiber-reinforced polyamide resin was proposed, but for satisfaction of the requirements of UL94 V-0 specification at a thickness of 1/32 inch, it was still needed to blend the melamine phosphate-based flame retardant in a great amount, possibly leading to deterioration in mechanical properties such as toughness and electrical properties such as tracking resistance, and thus the method was still practically far from satisfactory.

Alternatively, a method of using a phosphinate and a (reaction product of melamine and phosphoric acid) in combination (see, for example, Patent Document 1) and a method of using a phosphinate, a (reaction product of melamine and phosphoric acid) and a metal compound in combination (see, for example, Patent Document 2) were proposed, and the moldings obtained by these methods are known to satisfy the requirements in flame retardancy for molded articles of 1/16 inch in thickness by the UL94 V-0 specification. It is possible to reduce the amount of the flame retardant by these methods and thus to improve the mechanical properties (in particular, toughness such as bending deflection) and the electrical properties (tracking resistance) of the resulting moldings. However, when an inorganic filler is added in an amount of 40% or more for improvement in mechanical properties such as impact resistance, the content of the resin declines and thus the running properties at extrusion declines significantly, even if two or more flame retardants are blended, and for that reason, it was very difficult to produce a high-rigidity material that demands an inorganic filler at a high blending ratio. In addition, these compositions, which contain a highly flammable fatty acid metal salt, are still uncertain of their flame retardancy and far from satisfactory when used for improvement of flowability, release characteristics and others during molding.

In addition, very high rigidity and flame retardancy as well as favorable appearance are demanded for housing materials for electrical apparatuses represented by OA devices such as portable personal computer and word processor, and the reinforcing materials based on conventional technology are unfavorably exposed on the surface of the molded article during molding, causing waviness on the surface of the molded article and deterioration in appearance.

Patent Document 1: JP-A 2004-263188
Patent Document 2: JP-A 2007-23206

DISCLOSURE OF THE INVENTION

Problems to be Solved by the Invention

An object of the present invention is to provide a resin composition that gives moldings significantly high in rigidity, superior in surface smoothness and appearance, and extremely high in flame retardancy, generates no highly corrosive halogen-based and other gases during combustion and is superior in running properties at extrusion and also in moldability.

Means to Solve the Problems

After intensive studies to achieve the object above, the inventors have found that it was possible to achieve the object above with a composition containing a crystalline polyamide resin and an amorphous polyamide resin as a polyamide resin in combination with an inorganic filler, a phosphinate and a phosphorus-based antioxidant blended at a particular ratio, and made the present invention The present invention provides a flame-retardant glass fiber-reinforced polyamide resin composition, comprising:
100 parts by mass of a flame-retardant resin composition consisting of
(A) 60 to 90 percent by mass of a polyamide resin, and
(B) 40 to 10 percent by mass of a flame retardant containing no halogen atom,
(A)+(B) being 100 percent by mass; and
60 to 210 parts by mass of a flattened glass fiber (C) having a flat section of 1.5-10 in a ratio of major axis/minor axis,
wherein the polyamide resin (A) contains a crystalline polyamide resin (a1) and an amorphous polyamide resin (a2),
the flame retardant containing no halogen atom (B) contains a phosphinate (b1) and/or a diphosphinate (b2), and a blending ratio of the amorphous polyamide resin (a2) in the polyamide resin (A) is 0.1 (a2)/(A) 0.5.

Effect of the Invention

It is possible according to the present invention to provide a resin composition that gives moldings significantly high in rigidity, superior in surface smoothness and appearance and extremely high in flame retardancy, generates no highly corrosive halogen-based and other gases during combustion and is superior in extrusion processability and also in moldability. It is possible to reduce the blending ratio of the flame retardant relatively and to prevent decrease in running properties during kneading of the resin composition and deterioration in mechanical properties of the resin composition, by using an amorphous polyamide resin and a flame retardant containing no halogen atom in combination, even when an inorganic reinforcing material is blended in a greater amount. The flame-retardant reinforced polyamide resin composition can be used favorably as a material for parts such as parts in electric and electronic fields and electric parts in automobile field and also as a material for housing of electrical devices represented by OA devices such as portable personal computer, word processor, electronic dictionary, and cellphone that demand favorable appearance.

BEST MODE FOR CARRYING OUT THE INVENTION

The present invention will be described more specifically hereinafter.

The polyamide resin composition according to the present invention contains a crystalline polyamide resin and an amorphous polyamide resin.

The term "crystalline resin" means that a heat of fusion determined by using a differential scanning calorimeter (DSC) under nitrogen atmosphere at a rate of temperature increase of 16° C./minute, is larger than 1 cal/g. The term "amorphous resin" means that a heat of fusion determined by using a differential scanning calorimeter (DSC) under nitrogen atmosphere at a rate of temperature increase of 16° C./minute, is 1 cal/g or less.

Examples of the crystalline polyamide resins include the followings: polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecamethylene adipamide (nylon 116), polybis(4-aminocyclohexyl)methane dodecamide (nylon PACM12), polybis(3-methyl-4-aminocyclohexyl)methane dodecamide (nylon dimethyl PACM12), polyundecamethylene terephthalamide (nylon 11T), polyundecamethylene hexahydroterephthalamide (nylon 11T(H)), polyundecamide (nylon 11), polydodecamide (nylon 12), polytrimethylhexamethylene terephthalamide (nylon TMDT), polyhexamethylene isophthalamide (nylon 6I), polyhexamethylene terephthal/isophthalamide (nylon 6T/6I), poly-meta-xylylene adipamide (nylon MXD6), and copolymers and mixtures thereof. In particular among them, nylon 6, nylon 66 and the copolymeric polyamides and mixed polyamides thereof are preferable. The melting point of these crystalline polyamide resins is preferably 160 to 320° C., more preferably 180 to 300° C., for improvement in heat resistance of the flame-retardant glass fiber-reinforced polyamide resin composition obtained.

Examples of the amorphous polyamide resins include the followings: polycondensates of isophthalic acid/terephthalic acid/hexamethylenediamine/bis(3-methyl-4-aminocyclohexyl)methane, polycondensates of terephthalic acid/2,2,4-trimethylhexamethylenediamine/2,4,4-trimethylhexamethylenediamine, polycondensates of isophthalic acid/bis(3-methyl-4-aminocyclohexyl)methane/ω-laurolactam, polycondensates of isophthalic acid/terephthalic acid/hexamethylenediamine, polycondensates of isophthalic acid/2,2,4-trimethylhexamethylenediamine/2,4,4-trimethylhexamethylenediamine, polycondensates of isophthalic acid/terephthalic acid/2,2,4-trimethylhexamethylenediamine/2,4,4-trimethylhexamethylenediamine, polycondensates of isophthalic acid/bis(3-methyl-4-aminocyclohexyl)methane/ω-laurolactam and the like. Also included are the polycondensates above wherein the benzene rings of the terephthalic acid component and/or isophthalic acid component constituting the resins are substituted with alkyl groups or halogen atoms. These amorphous polyamides may be used in combination of two or more. Favorable are polycondensates of isophthalic acid/terephthalic acid/hexamethylenediamine, polycondensates of isophthalic acid/terephthalic acid/hexamethylenediamine/bis(3-methyl-4-aminocyclohexyl)methane, polycondensates of terephthalic acid/2,2,4-trimethylhexamethylenediamine/2,4,4-trimethylhexamethylenediamine, and mixtures of a polycondensate of isophthalic acid/terephthalic acid/hexamethylenediamine/bis(3-methyl-4-aminocyclohexyl)methane and a polycondensate of terephthalic acid/2,2,4-trimethylhexamethylenediamine/2,4,4-trimethylhexamethylenediamine. Particularly favorable are polycondensates of isophthalic acid/terephthalic acid/hexamethylenediamine, polycondensates of isophthalic acid/terephthalic acid/hexamethylenediamine/bis(3-methyl-4-aminocyclohexyl)methane, and the mixtures thereof. The glass transition temperature of these amorphous polyamide resins is preferably 80 to 200° C., more preferably 110 to 170° C., for improvement in heat resistance and processing compatibility of the flame-retardant glass fiber-reinforced polyamide resin composition obtained. A resin having a glass transition temperature of lower than 80° C. is less easily solidified during molding of the flame-retardant glass fiber-reinforced polyamide resin composition, causing troubles such as unfavorable mold release and elongation of the molding cycle, while a resin having a glass transition temperature of higher than 200° C. is solidified exceedingly rapidly during molding of the flame-retardant glass fiber-reinforced polyamide resin composition, often causing troubles in appearance such as molding sink and bad surface aspect because of glass fiber and also leading to increase in viscosity during blending and associated difficulty in uniform blending.

When the crystalline relaxation of the polyamide component is considered, the heat of fusion of the amorphous polyamide resin determined by using a differential scanning calorimeter under nitrogen atmosphere at a rate of temperature increase of 16° C./minute, should be 1 cal/g or less.

The blending ratio of the polyamide resins should be 60 to 90 percent by mass, with respect to the total amount of the polyamide resins (A) and the flame retardant containing no halogen atom (B) ((A)+(B)=100% by mass). A composition having a blending ratio of less than 60 percent by mass leads to decrease in running properties at extrusion and molding processability. A composition having a blending ratio of more than 90 percent by mass unfavorably leads to deterioration in flame retardancy.

The polyamide resin should include a crystalline polyamide resin and an amorphous polyamide resin blended, and the mass ratio of the amorphous polyamide resin in the polyamide resin should be 0.1 to 0.5. A composition having an amorphous polyamide ratio of less than 0.1 gives a product lower in surface smoothness when it is blended with inorganic fillers (fibrous reinforcing material and plate-shaped silicate) at high concentrations, as in the present invention, thus prohibiting use of the product in applications demanding favorable appearance such as housings for notebook computer. When the ratio is over 0.5 and inorganic fillers are blended at a high-concentration, smooth surface can not be obtained unless the composition is molded in a high-temperature mold, because these amorphous polyamides generally have high glass transition temperatures and lead to elongation of molding cycle and also to decrease in productivity, for example, during injection molding because of lowering in crystallinity.

The relative viscosity of the polyamide resin for use in the present invention is not particularly limited, but the relative viscosity, as determined by using 96-wt % conc. sulfuric acid as a solvent under the conditions of a temperature of 25° C. and a concentration of 1 g/dl, is preferably in the range of 1.5 to 4.0. A polyamide resin having a relative viscosity of less than 1.5 makes it difficult to withdraw the resin after melt and kneaded and also to provide the composition with desired physical properties because of its low viscosity. A polyamide resin having a relative viscosity of more than 4.0 leads to deterioration in flowability during molding and elongation of the period needed for injection of the resin into mold because of its high viscosity, to decrease in resin temperature at the flowing front, and consequently to deterioration in conjugation of the resin in the weld region, giving moldings lower in weld strength, compared to polyamide resins having a relative viscosity of 1.5 to 4.0. From the viewpoint of insurance of flowability, transcriptional properties of the resin to mold and the appearance and weld strength of molded article, a polyamide resin having a relative viscosity of 1.8 to 3.0 is favorably used.

Examples of the flame retardant containing no halogen atom (B) for use in the present invention include phosphinates, diphosphinates, polymers thereof, melamine polyphosphate, melamine cyanurate, red phosphorus, phosphate esters, condensed phosphate esters, phosphazene compounds, metal hydroxides and the like, but, in the present invention, at least a phosphinate and/or a diphosphinate is preferably used from the viewpoints of stability during processing, dispersibility during kneading with resins and flame-retarding efficiency. The phosphinate, which is prepared in water by using phosphinic acid and a metal carbonate, a metal hydroxide or a metal oxide, is present essentially as monomer, but may be present as a polymeric phosphinate having a condensation degree of 1 to 3 depending on the reaction condition. Examples of the metal components include metal carbonate, metal hydroxides and metal oxides containing calcium ion, magnesium ion, aluminum ion, and/or zinc ion.

Such a phosphinate is represented by the following General Formula (I), while the diphosphinate is represented by the following General Formula (II):

[Formula I]

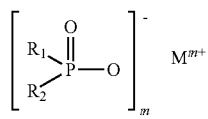

(I)

[Formula II]

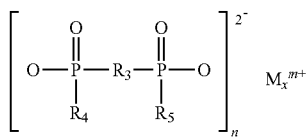

(II)

wherein $R^1$, $R^4$, $R^2$ and $R^5$ each independently represent a straight- or branched-chain $C_1$ to $C_{16}$ alkyl, preferably a $C_1$ to $C_6$ alkyl, and in particular, methyl, ethyl, n-propyl, isopropyl, n-butyl, tert-butyl, n-pentyl, n-octyl or phenyl, more preferably ethyl, and
$R^1$ and $R^2$, $R^4$ and $R^5$ may bind to each other to form a ring independently. $R^3$ represents a straight- or branched-chain $C_1$ to $C_{10}$ alkylene, in particular methylene, ethylene, n-propylene, isopropylene, isopropylidene, n-butylene, tert-butylene, n-pentylene, n-octylene or n-dodecylene; an arylene, in particular phenylene, naphthylene or an alkylarylene, in particular methylphenylene, ethylphenylene, tert-butylphenylene, methylnaphthylene, ethylnaphthylene, or tert-butylnaphthylene; or an arylalkylene, in particular phenylmethylene, phenylethylene, phenylpropylene, or phenylbutylene; M represents calcium, aluminum, magnesium or zinc, preferably aluminum or zinc, more preferably aluminum; m is 2 or 3; n is 1 or 3; and x is 1 or 2. In Formula (II), mx is 2n (mx=2n).

Examples of the phosphinic acid favorable as the constituent component of the phosphinate include dimethylphosphinic acid, ethylmethylphosphinic acid, diethylphosphinic acid, methyl-n-propylphosphinic acid, isobutylmethylphosphinic acid, octylmethylphosphinic acid, methylphenylphosphinic acid, diphenylphosphinic acid and the like, and diethylphosphinic acid is preferable.

Typical examples of the phosphinates represented by Formula (I) include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, zinc diphenylphosphinate and the like.

Examples of the diphosphinic acids favorable as the constituent component of the diphosphinate include methanedi(methylphosphinic acid), benzene-1,4-di(methylphosphinic acid) and the like.

Typical examples of the diphosphinates represented by Formula (II) include calcium methanedi(methylphosphinate), magnesium methanedi(methylphosphinate), aluminum methanedi(methylphosphinic acid), zinc methanedi(methylphosphinate), calcium benzene-1,4-di(methylphosphinate), magnesium benzene-1,4-di(methylphosphinate), aluminum benzene-1,4-di(methylphosphinate), and zinc benzene-1,4-di(methylphosphinate).

Phosphinates favorably used in the present invention particularly from the viewpoint of flame retardancy and electrical properties are aluminum diethylphosphinate, zinc diethylphosphinate, more preferably aluminum diethylphosphinate, and diphosphinate favorably used are aluminum methanedi(methylphosphinate) and zinc methanedi(methylphosphinate). Mixtures of these salts, such as Exolit OP1230, Exolit OP1311, Exolit OP1312, and Exolit OP1314 commercially available from Clariant, can also be used favorably.

The phosphinate, the diphosphinate or the mixture thereof is preferably used as a pulverized powder having an average particle size (D50) (hereinafter, referred to simply as "particle size") of 100 μm or less, preferably 50 μm or less, from the points of the mechanical properties and the appearance of the molded articles obtained by molding the composition according to the present invention. Use of a powder having a particle size of 0.5 to 30 μm is particularly favorable, as it makes the molded articles more flame-retardant and significantly improved in strength. In the present invention, the particle size is defined as the particle size that corresponds to that at a cumulative weight of 50% when the particle size distribution curve is measured by using a particle distribution analyzer such as laser scattering particle size distribution analyzer.

In addition to the phosphinate, diphosphinate or the mixture thereof, a (reaction product from phosphoric acid and melamine) is more preferably used in combination as the flame retardant containing no halogen atom (B).

When the (reaction product from phosphoric acid and melamine) is used in addition to the phosphinic acid, diphosphinic acid, or the mixture thereof as the flame retardant containing no halogen atom (B), it is possible to improve the flame-retarding effects further more efficiently and, for example, to shorten afterflame time even if the flame-retarding level is same at V-0. It is also possible to reduce the amount of the flame retardant even at the same flame-retarding level, because the degree of freedom in blending the flame retardant for control of flame-retarding efficiency is expanded.

The blending ratio of the (reaction product from phosphoric acid and melamine) in the flame retardant containing no halogen atom (B) is preferably 10 to 30 percent by mass with respect to the total amount of the flame retardants (B). An excessively high blending ratio leads to drastic deterioration in running properties during melting and kneading and also in flame-retarding efficiency because of decrease in relative blending ratio of phosphinic acid or diphosphinic acid. An excessively low blending ratio leads to reduction of the advantage of using the (reaction product from phosphoric acid and melamine) in combination and also to deterioration in flame-retarding efficiency.

The (reaction product from phosphoric acid and melamine), which is generated in reaction of the hydroxyl group of phosphoric acid and the amino group of melamine, can be obtained in substantially equimolar reaction of phosphoric acid and melamine. In the present description, the phosphoric acid is understood to include orthophosphoric acids, polyphosphoric acids obtained dehydration condensation of orthophosphoric acid (such as pyrophosphoric acid, triphosphoric acid and tetraphosphoric acid), phosphorous acid, hypophosphorous acid, and metaphosphoric acid, unless otherwise indicated. Hereinafter, reaction products from a phosphoric acid and melamine will be referred to as melamine phosphates, and, for example, melamine orthophosphate is understood to mean a reaction product from orthophosphoric acid and melamine, and melamine polyphosphate, a reaction product from polyphosphoric acid and melamine. The melamine phosphate is understood to include reaction products from various phosphoric acids and melamine, and, for example, melamine orthophosphate, melamine polyphosphate, melamine phosphite, melamine hypophosphite, melamine metaphosphate, the mixtures thereof, and the like. In particular, the melamine polyphosphate is a generic term for melamine phosphate condensates, and includes melamine pyrophosphate, melamine triphosphate, melamine tetraphosphate, the mixtures thereof and the like. Favorable melamine phosphates are melamine orthophosphate, melamine polyphosphate and the mixtures thereof, and more favorable is melamine polyphosphate.

The production method for the melamine phosphate is not particularly limited, but normally, it is produced by mixing a desired aqueous phosphoric acid solution with an aqueous melamine solution thoroughly for generation of the reaction product as fine particles, and filtering, cleaning and drying the fine particles. The melamine polyphosphate is produced, for example, by kneading polyphosphoric acid and melamine under high-temperature atmosphere for solid phase reaction or by condensation reaction of melamine phosphate. The melamine polyphosphate may be prepared by direct condensation reaction of orthophosphoric acid and melamine as starting materials.

The melamine phosphates are available as commercial products. Examples of the melamine polyphosphate for use include Melapur200/70 (product of Ciba Specialty Chemicals), PMP-100 (product of Nissan Chemical Industries) and the like.

The melamine phosphate is used as a powder having a particle size of 100 μm or less, preferably 50 μm or less, from the viewpoints of mechanical properties and appearance of molded articles obtained from the composition according to the present invention. Use of a powder having a particle size of 0.5 to 20 μm is particularly preferable because the strength of molded articles becomes high in addition to development of high flame retardancy.

It is needed that the blending ratio of the flame retardant containing no halogen atom is 10 to 40 percent by mass with respect to the total amount of the polyamide resin (A) and the flame retardant containing no halogen atom (B) ((A)+(B)= 100% by mass). A flame retardant blending-ratio of less than 10 percent by mass unfavorably leads to insufficient flame retardancy, while a blending ratio of more than 40 percent by mass leads to deterioration in running properties at extrusion and mechanical strength and also to mold staining.

In the present invention, it is possible to reduce the blending ratio of the flame retardant containing no halogen atom (B) by increasing the ratio of the amorphous polyamide (a2) contained in the polyamide resin (A). It is possible to use the flame retardant containing no halogen atom (B) at a ratio from 10 to less than 24 percent by mass by using an amorphous polyamide resin (a2) at a ratio of: $0.4 \leq (a2)/(A) \leq 0.5$. It is, of course, possible nevertheless to use it at a ratio of more than 24 percent by mass and 40 percent by mass or less. By using the flame retardant in a smaller amount, it is possible to prevent more effectively deterioration in running properties at extrusion, mechanical strength and the mold staining that often occur when a flame retardant is blended. It is because the benzene ring of phthalic acid constituting the skeleton of the amorphous polyamide (A2) is very stable and thus resistant to combustion.

Decrease of the ratio of amorphous polyamide (a2) may lead to demand for a greater amount of the flame retardant compared to the case where the amorphous polyamide resin (a2) is contained at a large ratio of: $0.4 \leq (a2)/(A) \leq 0.5$, as described above. When the ratio of the amorphous polyamide (a2) contained in the polyamide resin (A) is in the range of:

$0.1 \leq (a2)/(A) < 0.4$, the flame retardant containing no halogen atom (B) is used favorably at a ratio of 24 to 40 percent by mass.

Examples of the cross-sectional shape of the flattened glass fiber (C) according to the present invention having a flat section at a major axis/minor axis ratio of 1.5 to 10 are flat dumbbell-like, cocoon-like, oblong, elliptical, rectangular and other shapes analogous thereto, but the shape is not particularly limited thereto, as long as the shape has the major axis defined as the maximum length of the line passing the center and the minor axis defined as the minimum length of the line passing the center. A flat fiber having a major/minor diameter ratio of 1.5 to 10, preferably 2.0 to 6.0, is used for reduction of warping peculiar to glass fiber-containing polyamides. A flat fiber having a major axis/minor axis ratio of 1.5 or less has smaller advantages of having the flat sectional shape, while a flat fiber having a ratio of 10 or more cannot be produced easily. The glass fiber for use may be selected from long fiber-type lobing, short fiber-type chopped strand, milled fiber and the like. The glass fiber for use may be a fiber surface-treated with a silane-coupling agent such as epoxysilane or aminosilane.

A flattened glass fiber having an average length of 1 to 15 mm, preferably 2 to 10 mm, is used in the present invention. The average length above is the average length of 20 flattened glass fibers, as determined under microscope by using a micro scale as standard. An average fiber length of longer than 15 mm leads to decrease in fluidity of the resin during resin molding and thus decrease in workability, while an average length of less than 1 mm to failing to secure mechanical strength sufficiently.

A glass fiber having a circular cross section may be used as the glass fiber, in addition to the flattened glass fiber having a flat section.

The blending ratio of the flattened glass fiber (C) having a flat section at a major axis/minor axis ratio of 1.5 to 10 is 60 to 210 parts by mass, preferably 70 to 200 parts by mass, with respect to 100 parts by mass of the resin composition consisting of the polyamide resin (A) and the flame retardant containing no halogen atom (B). A blending ratio of less than 70 parts by mass leads to insufficient strength, rigidity and heat resistance, while a blending ratio of more than 200 parts by mass, to deterioration in melting and blending processability and molding processability. The flattened glass fiber having a flat section has a surface area per unit mass larger than that of the glass fiber having a circular glass cross section, and thus raises the ratio of flattened glass fibers on the molded article surface exposed after molding of the resin composition and increases flame retardancy of the molded article, because of the fire-resistance of the flattened glass fiber.

The flame-retardant glass-reinforced polyamide resin composition becomes more favorable in moldability when it contains a phosphorus-based antioxidant (D).

The phosphorus-based antioxidant (D) may be an inorganic or organic compound and is not particularly limited. Favorable phosphorus compounds include inorganic phosphate such as monosodium phosphate, disodium phosphate, trisodium phosphate, sodium phosphite, calcium phosphite, magnesium phosphite, and manganese phosphite; and organic phosphorus compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite ("ADKSTAB PEP-36", molecular weight: 633), bis(2,4-di-tert-butylphenyl) pentaerythritol diphosphite ("ADKSTAB PEP-24G", molecular weight: 604), tris(2,4-di-tert-butylphenyl)phosphite, distearyl pentaerythritol diphosphite ("ADKSTAB PEP-8", molecular weight: 733), bis(nonylphenyl)pentaerythritol diphosphite ("ADKSTAB PEP-4C", molecular weight: 633), tetra(tridecyl-4,4'-isopropylidenediphenyl diphosphite, 2,2-methylenebis(4,6-di-tert-butylphenyl)octyl phosphite, and the like. These compounds may be used alone or as a mixture thereof.

Generally, fatty acid amides (stearic amide, etc.) have been known as additives for improvement in release characteristics during injection molding, but these compounds are flammable and thus, addition thereof leads to deterioration in flame retardancy. Normally, antioxidants such as phosphorus-based antioxidants are used for suppression of thermal degradation and discoloration of resins and not for providing release characteristics, but it was found that it was possible by using a phosphorus-based antioxidant to improve its inherent anti-oxidative function and also its release characteristics without deterioration in flame-retarding properties of the flame retardant. In particular, phosphorus-based antioxidants having a pentaerythritol diphosphite skeleton and a molecular weight of 600 or more and less than 800, such as bis(2,6-di-tert-butyl-4-methylphenyl)pentaerythritol diphosphite ("ADKSTAB PEP-36", molecular weight: 633), bis(2,4-di-tert-butylphenyl)pentaerythritol diphosphite ("ADKSTAB PEP-24G", molecular weight: 604), tris(2,4-di-tert-butylphenyl) phosphite, distearylpentaerythritol diphosphite ("ADKSTAB PEP-8", molecular weight: 733), and bis(nonylphenyl) pentaerythritol diphosphite ("ADKSTAB PEP-4C", molecular weight: 633) are particularly preferable. Among them, PEP-36 and PEP-24G, superior in heat resistance, can be used most favorably.

The phosphorus-based antioxidants are readily miscible uniformly with the flame retardant used in the present invention such as phosphinate or diphosphinate and prevent decomposition of the flame retardant without impairing its flame-retarding properties. The decrease in molecular weight of the polyamide resin is also prevented, thus giving a resin composition superior in running properties during extrusion processing, moldability, and mechanical physical properties. In particular, drastic effects can be achieved in release characteristics during molding and reduction of generation of gas during molding. They are also effective, for example, in preventing clogging of the gas vent of mold in continuous injection molding and thus providing molded articles without molding defect even after continuous molding over a prolonged period, and thus in reducing the frequency of mold cleaning.

The content of the phosphorus-based antioxidant (D) is 0.01 to 5 parts by mass, preferably 0.05 to 4 parts by mass, with respect to 100 parts by mass of the resin composition consisting of the polyamide resin (A) and the flame retardant containing no halogen atom (B). Use of it in an excessively larger amount leads to deterioration in stability during extrusion processing, moldability, and mechanical physical properties, while use of it in an excessively smaller amount to deterioration in mold release characteristic during molding and clogging of the mold gas vent, making it difficult to carry out continuous injection molding.

In the present invention, at least one compound selected from the group consisting of fatty amines, fatty acid metal salts, ethylene bisamide compounds, fatty amides and silicone compounds may be used as an arbitrary additional component. The object of the present invention may be achieved without the component, but such a component may be added for improvement in flowability and release characteristics, if desired. In particular, silicone compounds, which are effective in improving flame retardancy, are favorable, and silicone oils are the most favorable. The amount thereof added is 0.05 to 2 parts by mass, preferably 0.1 to 1.5 parts by mass, and still more preferably 0.1 to 1 part by mass, with respect to 100 parts by mass of the resin composition containing the polyamide resin (A) and the flame retardant containing no halogen atom (B).

The silicone oils are organic silicon compounds having siloxane bonds as a skeleton and organic groups directly bound to the silicon atoms. The organic group directly bound to silicon atoms include methyl group, ethyl group, phenyl group, vinyl group, trifluoropropyl group and the mixtures thereof, but any known silicone oil containing these groups may be used without particular restriction. In addition, silicone oils in which part of the organic groups above are substituted with substituents having an epoxy, amino, polyether, carboxyl, mercapto, ester, chloroalkyl, alkyl (having a carbon number of 3 or more), hydroxyl group or other group can also be used.

Typical examples of the silicone oils include oily silicones such as dimethyl silicone oil, phenylmethyl silicone oil, alkyl-modified silicone oils, fluorosilicone oil, polyether-modified silicone oils, fatty ester-modified silicone oils, amino-modified silicone oils, carboxylic acid-modified silicone oils, carbinol-modified silicone oils, epoxy-modified silicone oils and mercapto-modified silicone oils.

The flame-retardant reinforced polyamide resin composition according to the present invention may contain other additives including colorants such as pigments and dyes, heat stabilizers, weathering-resistance improvers, nucleating agents, plasticizers, releasing agents, antistatic agents, other resin polymers and the like in the ranges that do not impair the object of the invention.

The method of producing the flame-retardant polyamide resin composition according to the present invention is not particularly limited, but it is preferably produced by melting and kneading the components in a biaxial extruder at a temperature of 200 to 350° C., and it is preferable, for improvement of both of flame retardancy and mechanical properties, to melt and mix raw materials other than inorganic filler thoroughly, then add the inorganic filler thereto and deaerate the resulting mixture under reduced pressure. The composition according to the present invention is molded by a known method such as injection molding, extrusion molding or blow molding into various molded articles in electric, electronic and automobile applications such as connectors, coil bobbins, breakers, electromagnetic switches, holders, plugs and switches and also into housing components for electrical devices including OA devices such as portable personal computers and word processors.

EXAMPLES

Hereinafter, the present invention will be described more specifically with reference to Examples. The materials and the evaluation methods used in Examples and Comparative Examples are as follows:

(1) Materials Used
(A) Polyamide Resin
(a1) Crystalline Polyamide Resin

Crystalline polyamide resin (a1-1): polyamide 66 (24AD1, product of Rhodia) (melting point: 265° C., relative viscosity: 2.4, heat of fusion: 21 cal/g)

Crystalline polyamide resin (a1-2): polyamide 6 (A1015, product of UNITIKA. LTD (melting point: 220° C., relative viscosity: 2.0, heat of fusion: 18 cal/g)

(a2) Amorphous Polyamide Resin

Amorphous polyamide resin (a2-1): polycondensate of isophthalic acid/terephthalic acid/hexamethylenediamine/bis(3-methyl-4-aminocyclohexyl)methane (CX-3000, product of UNITIKA. LTD) (glass transition temperature: 125° C., relative viscosity: 1.9, heat of fusion: 0.1 cal/g)

Amorphous polyamide resin (a2-2): polycondensate of isophthalic acid/terephthalic acid/hexamethylenediamine (X21, product of Mitsubishi Engineering-Plastics Corp.) (glass transition temperature: 138° C., relative viscosity: 2.0, heat of fusion: 0.1 cal/g)

(B) Flame Retardant

Flame retardant (B-1): aluminum diethylphosphinate (particle size: 20 μm)

Flame retardant (B-2): melamine polyphosphate (particle size: 20 μm; Melapur 200/70, product of Ciba Specialty Chemicals)

Flame retardant (B-3): melamine cyanurate (particle size: 8 μm; MC25, product of Ciba Specialty Chemicals)

Flame retardant (B-4): magnesium hydroxide (particle size: 0.8 μm; MGZ-1, product of Sakai Chemical Industry CO., Ltd)

(C) Glass Fiber

Glass fiber (C-1): flattened glass fiber having an oblong shape with a major axis/minor axis ratio of 4 (CSG3PA820S product of Nitto Boseki Co., Ltd.; major axis: 28 μm, minor axis: 7 μm, fiber length: 3 mm, treated with a silane-based surface-treating agent)

Glass fiber (C-2): glass fiber having a circular cross section (03JAFT692, product of Asahi Fiber Glass Co., Ltd.; average fiber diameter: 10 μm, fiber length: 3 mm)

(D) Antioxidant

Phosphorus-based antioxidant (D-1): bis(2,6-di-t-butyl-4-methylphenyl)pentaerythritol diphosphite (ADKSTAB PEP-36, product of Adeka Corp.)

Phosphorus-based antioxidant (D-2): distearyl pentaerythritol diphosphite (ADKSTAB PEP-8, product of Adeka Corp.)

Sodium phosphite (D-3) (reagent)

Hindered phenol-based antioxidant (D-4): N,N'-hexane-1,6-diyl bis[3-(3,5-di-tert-butyl-4-hydroxyphenylpropionamide) (Irganox1098, product of Ciba Specialty Chemicals)

(E) Silicone Oil

Silicone oil (E-1): methylphenyl silicone oil (TSF4300, product of GE Toshiba Silicones Co., Ltd.)

(F) Releasing Agent

Sodium montanate (F-1) (NS-8, product of Nitto Kasei Co., Ltd.)

(2) Evaluation a) Running Properties During Melting and Kneading

Ten kg of the composition of each Example or Comparative Example was produced in a biaxial extruder (TEM37, manufactured by Toshiba Machine Co., Ltd.) under the conditions of a cylinder temperature of 280° C., a screw rotation frequency of 200 rpm and a discharge rate of 35 kg/h, and the strands obtained were evaluated visually. A strand not broken during operation was ranked as "○" and a strand broken even once during operation was ranked as "x". The operating properties with rank "○" was considered favorable and satisfactory.

b) Bending Strength and Bending Modulus

A test piece (length: 150 mm, width: 10 mm, thickness: 3 mm) was molded in a one-gate mold by an injection molding machine (α-100iA) manufactured by Fanuc Ltd at a resin temperature of 280° C. and a mold temperature of 100° C., and the bending strength and the bending modulus thereof were determined according to ASTM D790. A bending strength of 200 MPa or more and a bending modulus of 12 GPa or more were considered satisfactory.

c) Flame Retardancy

A test piece was molded by using an injection molding machine (α-100iA) manufactured by Fanuc Ltd at a resin temperature of 280° C. and a mold temperature of 100° C., and the flame retardancy thereof was determined according to the criteria of UL94 (specification established by Underwriters Laboratories Inc. in the U.S.) shown in Table 1. The thickness of the test piece was 1/32 inch (approximately 0.8 mm). The flame retardancy of V-1 or more was considered satisfactory. The total afterflame time during measurement of flame retardancy was also determined. For example, a test piece in the same flame-retarding level of V-0 but with a shorter total afterflame time means that it is superior in flame retardancy.

TABLE 1

|  | V-0 | V-1 | V-2 |
|---|---|---|---|
| Afterflame time of one time | 10 seconds or less | 30 seconds or less | 30 seconds or less |
| Total afterflame time of 5 test pieces and total 10 times | 50 seconds or less | 250 seconds or less | 250 seconds or less |
| Cotton ignition by dripping | No | No | Yes |
| Complete combustion of test piece | No | No | No |

Test pieces at a flame-retarding level not satisfying the specification shown in Table 1 will be indicated by "V-not".

d) Release Characteristics During Continuous Molding

Shallow cup-shaped moldings (thickness: 1.5 mm, external diameter: 40 mm, depth: 30 mm) were produced repeatedly for 500 shots in an injection molding machine (α-100iA) manufactured by Fanuc Ltd at a resin temperature of 280° C., a mold temperature of 100° C. and a injection cycle of 25 seconds, and marks formed by ejector pin on the moldings of 451st to 500th shots were examined visually. A molding with 5 or more pin marks was ranked "x", a molding with 1 to 4 pin marks, "○" and a molding without pin mark, "□". Moldings with ranks "○" or higher were considered to show favorable release characteristics and thus to be satisfactory.

e) Clogging of Gas Vent During Continuous Molding

Clogging of the gas vent having a depth of 4 μm and a width of 1 mm was examined visually after molding of the test piece of d), and complete clogging was ranked "x", some clogging "Δ" and no clogging "○". Clogging ranked "○" was considered satisfactory.

f) Surface Roughness

The average surface roughness (μm) of a flat molded plate of 50 mm×90 mm×2 mm in size was determined in arbitrary 10 regions by using a surface roughness meter (Surfcorder SE-3400) manufactured by Kosaka Laboratory Ltd. An average surface roughness of 20 μm or less was considered satisfactory.

g) Bending Modulus in Weld Region

A test piece (length: 150 mm, width: 10 mm, thickness: 3 mm) was molded in a mold having two gates at both ends by using an injection molding machine (α-100iA) manufactured by Fanuc Ltd at a resin temperature of 280° C. and a mold temperature of 100° C., and the bending modulus of the test piece in the weld region formed at the center was evaluated according to ASTM D790. The bending modulus in weld region is, in particular, a measure of deflection degree caused by stress in the weld region. If the bending modulus in weld region is not sufficiently high, the molded article may be broken in the weld region by repeated load of stress when used practically. Thus, the bending modulus in the weld region is desirably sufficiently high not only for appearance but also for that reason. The retention rate of the bending modulus was calculated as the ratio of the bending modulus b) to the bending modulus in weld region g), according to the following Formula: Retention rate of bending modulus (%)={(Bending modulus in weld region)/(Bending modulus)}×100.

The retention rate of bending modulus is 100% when there is no deterioration in bending modulus at all. Generally, there is deterioration in bending modulus to some extent, and a retention rate of 60% or more is favorable, and a retention rate of 65% or more is more favorable.

Example I-1

One hundred parts by mass of a flame-retardant polyamide resin composition containing 51.8 percent by mass of a crystalline polyamide resin (a1-1), 22.2 percent by mass of an amorphous polyamide (a2-1) and 26.0 percent by mass of a flame retardant (B-1) were blended with 100 parts by mass of a glass fiber (C-1) in a biaxial extruder (TEM37, manufactured by Toshiba Machine Co., Ltd) under the conditions of a cylinder temperature set to 280° C., a screw rotation of 200 rpm and a discharge rate of 35 kg/h, while the components other than the glass fiber were fed from the main inlet and the glass fiber from the side inlet, and the blend was kneaded and extruded into strands, which were granulated with a cutter after cooling to give pellets of the polyamide resin composition. The properties of the pellet obtained were evaluated by the measuring methods described above. The results are summarized in Table 2.

Examples I-2 to I-16

Pellets were prepared in a manner similar to Example I-1, except that the blending ratio of the components was changed as shown in Table 2 and the cylinder temperature of the biaxial extruder in Example I-5 was changed to 260° C., and the various properties thereof were determined. The results are summarized in Tables 2 and 3.

TABLE 2

|  |  |  |  | Example | | | | | | | |
|---|---|---|---|---|---|---|---|---|---|---|---|
|  |  |  |  | I-1 | I-2 | I-3 | I-4 | I-5 | I-6 | I-7 | I-8 |
| Blending rate (parts by mass) |  | Polyamide resin/flame retardant |  | 100.0 | 100.0 | 100.0 | 100.0 | 100.0 | 100.0 | 100.0 | 100.0 |
|  | Resin composition (percent by mass) | Crystalline polyamide resin (a1) | a1-1 | 51.8 | 38.5 | 64.8 | 66.6 |  | 51.8 | 51.8 | 51.8 |
|  |  |  | a1-2 |  |  |  |  | 58.4 |  |  |  |
|  |  | Amorphous polyamide resin (a2) | a2-1 | 22.2 | 38.5 |  | 7.4 | 14.6 | 22.2 | 22.2 | 22.2 |
|  |  |  | a2-2 |  |  | 7.2 |  |  |  |  |  |
|  |  | Flame retardant (B) | B-1 | 26.0 | 23.0 | 28.0 | 26.0 | 27.0 | 26.0 | 26.0 | 26.0 |
|  |  |  | B-2 |  |  |  |  |  |  |  |  |
|  |  |  | B-3 |  |  |  |  |  |  |  |  |

TABLE 2-continued

|  |  |  | Example |  |  |  |  |  |  |  |
|---|---|---|---|---|---|---|---|---|---|---|
|  |  |  | I-1 | I-2 | I-3 | I-4 | I-5 | I-6 | I-7 | I-8 |
|  | Glass fiber (C) | C-1 | 100 | 100 |  | 100 | 100 | 70 | 200 | 100 |
|  |  | C-2 |  |  | 100 |  |  |  |  |  |
|  | Silicone oil (E) | E-1 |  |  |  |  |  |  |  | 0.2 |
|  | (a2)/(a1) + (a2) |  | 0.3 | 0.5 | 0.1 | 0.1 | 0.2 | 0.3 | 0.3 | 0.3 |
|  | (B-2)/(B) |  | 0.00 | 0.00 | 0.00 | 0.00 | 0.00 | 0.00 | 0.00 | 0.00 |
| Properties | Running properties |  | ○ | ○ | ○ | ○ | ○ | ○ | ○ | ○ |
|  | Blending strength | MPa | 270 | 265 | 260 | 260 | 250 | 250 | 330 | 270 |
|  | Blending modulus | GPa | 16.5 | 16 | 15.5 | 16 | 15.5 | 13 | 21 | 16.5 |
|  | Flame retardance |  | V-0 | V-0 | V-0 | V-1 | V-0 | V-0 | V-0 | V-0 |
|  | Total afterflame time | second | 46 | 45 | 44 | 62 | 48 | 44 | 47 | 46 |
|  | Release characteristics |  | ○ | ○ | ○ | ○ | ○ | ○ | ○ | ○ |
|  | Surface roughness | μm | 13 | 7 | 19 | 19 | 15 | 5 | 17 | 12 |

TABLE 3

|  |  |  |  | Example |  |  |  |  |  |  |  |
|---|---|---|---|---|---|---|---|---|---|---|---|
|  |  |  |  | I-9 | I-10 | I-11 | I-12 | I-13 | I-14 | I-15 | I-16 |
| Blending rate (parts by mass) | Polyamide resin/flame retardant |  |  | 100.0 | 100.0 | 100.0 | 100.0 | 100.0 | 100.0 | 100.0 | 100.0 |
|  | Resin composition (percent by mass) | Crystalline polyamide resin (a1) | a1-1 | 45.0 | 54.0 | 51.8 | 38.5 | 64.8 | 51.8 | 51.8 | 52.5 |
|  |  |  | a1-2 |  |  |  |  |  |  |  |  |
|  |  | Amorphous polyamide resin (a2) | a2-1 | 45.0 | 6.0 | 22.2 | 38.5 |  | 22.2 | 22.2 | 22.5 |
|  |  |  | a2-2 |  |  |  |  | 7.2 |  |  |  |
|  |  | Flame retardant (B) | B-1 | 10.0 | 40.0 | 21.0 | 19.0 | 21.0 | 23.4 | 18.2 | 17.5 |
|  |  |  | B-2 |  |  | 5.0 | 4.0 | 7.0 | 2.6 | 7.8 | 7.5 |
|  |  |  | B-3 |  |  |  |  |  |  |  |  |
|  | Glass fiber (C) |  | C-1 | 100 | 100 | 100 | 100 |  | 100 | 100 | 100 |
|  |  |  | C-2 |  |  |  |  | 100 |  |  |  |
|  | Silicone oil (E) |  | E-1 |  |  |  |  |  |  |  |  |
|  | (a2)/(a1) + (a2) |  |  | 0.5 | 0.1 | 0.3 | 0.5 | 0.1 | 0.3 | 0.3 | 0.3 |
|  | (B-2)/(B) |  |  | 0.00 | 0.00 | 0.19 | 0.17 | 0.25 | 0.10 | 0.30 | 0.30 |
| Properties | Running properties |  |  | ○ | ○ | ○ | ○ | ○ | ○ | ○ | ○ |
|  | Blending strength | MPa |  | 280 | 230 | 270 | 265 | 260 | 270 | 270 | 280 |
|  | Blending modulus | GPa |  | 15.5 | 17 | 16.5 | 16 | 16 | 16.5 | 16.5 | 16.5 |
|  | Flame retardance |  |  | V-1 | V-0 | V-0 | V-0 | V-0 | V-0 | V-0 | V-0 |
|  | Total afterflame time | second |  | 125 | 40 | 21 | 20 | 21 | 27 | 29 | 31 |
|  | Release characteristics |  |  | ○ | ○ | ○ | ○ | ○ | ○ | ○ | ○ |
|  | Surface roughness | μm |  | 5 | 18 | 13 | 7 | 19 | 13 | 13 | 12 |

Comparative Examples I-1 to I-11

Pellets were prepared in a manner similar to Example I-1, except that the blending ratio of the components was changed as shown in Table 2 and the various properties thereof were determined. The results are summarized in Table 4.

TABLE 4

|  |  |  |  | Comparative Example |  |  |  |  |  |  |  |  |  |  |
|---|---|---|---|---|---|---|---|---|---|---|---|---|---|---|
|  |  |  |  | I-1 | I-2 | I-3 | I-4 | I-5 | I-6 | I-7 | I-8 | I-9 | I-10 | I-11 |
| Blending rate (parts by mass) | Polyamide resin/flame retardant |  |  | 100.0 | 100.0 | 100.0 | 100.0 | 100.0 | 100.0 | 100.0 | 100.0 | 100.0 | 100.0 | 100.0 |
|  | Resin composition (percent by mass) | Crystalline polyamide resin (a1) | a1-1 | 51.8 | 42.0 | 51.8 | 51.8 | 51.8 | 70 | 30.8 | 73.6 | 49.5 | 51.8 | 51.8 |
|  |  |  | a1-2 |  |  |  |  |  |  |  |  |  |  |  |
|  |  | Amorphous polyamide resin (a2) | a2-1 | 22.2 | 18.0 | 22.2 | 22.2 | 22.2 |  | 46.2 | 18.4 | 5.5 | 22.2 | 22.2 |
|  |  |  | a2-2 |  |  |  |  |  |  |  |  |  |  |  |
|  |  | Flame retardant (B) | B-1 |  |  |  | 21.0 |  | 13 | 30 | 23 | 8 | 45 | 26.0 | 26.0 |
|  |  |  | B-2 |  |  |  |  | 13 |  |  |  |  |  |  |
|  |  |  | B-3 | 26.0 | 40 | 5 |  |  |  |  |  |  |  |  |
|  |  |  | B-4 |  |  |  | 26.0 |  |  |  |  |  |  |  |
|  | Glass fiber (C) |  | C-1 | 100 | 100 | 100 | 100 | 100 | 100 | 100 | 100 | 100 | 50 | 230 |
|  |  |  | C-2 |  |  |  |  |  |  |  |  |  |  |  |
|  | Silicone oil (E) |  | E-1 |  |  |  |  |  |  |  |  |  |  |  |
|  | (a2)/(a1) + (a2) |  |  | 0.3 | 0.3 | 0.3 | 0.3 | 0.3 | 0 | 0.6 | 0.2 | 0.1 | 0.30 | 0.3 |
|  | (B-2)/(B) |  |  | 0.00 | 0.00 | 0.00 | 0.00 | 0.5 | 0.00 | 0.00 | 0.00 | 0.00 | 0.00 | 0.00 |

TABLE 4-continued

|  |  |  | Comparative Example | | | | | | | | | | |
|---|---|---|---|---|---|---|---|---|---|---|---|---|---|
|  |  |  | I-1 | I-2 | I-3 | I-4 | I-5 | I-6 | I-7 | I-8 | I-9 | I-10 | I-11 |
| Properties | Running properties |  | ○ | X | ○ | X | X | ○ | X | ○ | X | ○ | X |
|  | Blending strength | MPa | 270 | 190 | 270 | A strand could not be extruded | A strand could not be extruded | 260 | 240 | 290 | 190 | 205 | A strand could not be extruded |
|  | Blending modulus | GPa | 16 | 15.5 | 16.5 |  |  | 16 | 15 | 15.5 | 17 | 10.5 |  |
|  | Flame retardance |  | V-not | V-not | V-not |  |  | V-0 | V-0 | V-not | V-0 | V-0 |  |
|  | Total afterflame time | second | >250 | >250 | >250 |  |  | 47 | 44 | >250 | 19 | 45 |  |
|  | Release characteristics |  | ○ | ○ | ○ |  |  | ○ | X | ○ | ○ | ○ |  |
|  | Surface roughness | μm | 19 | 25 | 13 |  |  | 52 | 9 | 16 | 24 | 5 |  |

The resin compositions of Examples I-1 to I-16, which satisfy the requirements of the present invention, were excellent in running properties, mechanical properties, flame retardancy, release characteristics, resistance to gas vent clogging and surface roughness.

The resin compositions of Comparative Examples I-1- to 3, which used a flame retardant melamine cyanurate outside the scope of the present invention, were poor in flame retardancy. Because the resin composition of Comparative Example I-4 used a flame retardant magnesium hydroxide outside the scope of the present invention, extrusion into strands during kneading could not be carried out and resin pellets could not be obtained. Because the resin composition of Comparative Example I-5 had a greater melamine polyphosphate content in the blending ratio of aluminum diethylphosphinate to melamine polyphosphate, extrusion into strands during kneading could not be carried out and resin pellets could not be obtained. The resin composition of Comparative Example I-6, which did not contain an amorphous polyamide, was poor in surface roughness. Because the resin composition of Comparative Example I-7 contained the amorphous polyamide in a greater amount, strands could not be cooled rapidly, resulting in making extrusion difficult and lowering running properties, and the composition in mold during injection molding could not be hardened in a short cycle, resulting in inferior release characteristics. The resin composition of Comparative Example I-8, which contained the flame retardant added in a smaller amount (i.e., which contained the polyamide resin in a greater amount), was low in flame-retarding properties. The resin composition of Comparative Example I-9 contained the flame retardant in a greater amount (i.e., contained the polyamide resin in a smaller amount) was brittle, resulting in being poor in running properties and bending strength. The resin composition of Comparative Example I-10, which contained the flattened glass fiber in a smaller amount, was poor in bending modulus. Because the resin composition of Comparative Example I-11 contained flattened glass fiber in an excessively large amount, extrusion of strands during kneading could not be carried out and resin pellets could not be obtained.

Example II-1

One hundred parts by mass of a flame-retardant polyamide resin composition containing 51.8 percent by mass of a crystalline polyamide resin (a1-1), 22.2 percent by mass of an amorphous polyamide (a2-1), and 26.0 percent by mass of a flame retardant (B-1) was blended with 100 parts by mass of a glass fiber (C-1) and 1.0 part by mass of an antioxidant (D-1) in a biaxial extruder (TEM37, manufactured by Toshiba Machine Co., Ltd) under the conditions of a cylinder temperature set to 280° C., a screw rotation of 200 rpm and a discharge rate of 35 kg/h, while the components other than glass fiber were fed from the main inlet and the glass fiber from the side inlet, and the blend was kneaded and extruded into strands, which were granulated with a cutter after cooling to give pellets of the polyamide resin composition. The properties of the pellet obtained were evaluated by the measuring methods described above. The results are summarized in Table 5.

Examples II-2 to II-20

Pellets were prepared in a manner similar to Example II-1, except that the blending ratio of the components was changed as shown in Tables 5 and 6 and the cylinder temperature of the biaxial extruder in Example II-6 was changed to 260° C., and the various properties thereof were determined. The results are summarized in Tables 5 and 6.

TABLE 5

|  |  |  |  | Example | | | | | | | | | |
|---|---|---|---|---|---|---|---|---|---|---|---|---|---|
|  |  |  |  | II-1 | II-2 | II-3 | II-4 | II-5 | II-6 | II-7 | II-8 | II-9 | II-10 |
| Blending rate (parts by mass) | Polyamide resin/flame retardant | | | 100.0 | 100.0 | 100.0 | 100.0 | 100.0 | 100.0 | 100.0 | 100.0 | 100.0 | 100.0 |
|  | Resin composition (percent by mass) | Crystalline polyamide resin (a1) | a1-1 | 51.8 | 38.5 | 64.8 | 66.6 |  | 51.8 | 51.8 | 51.8 | 45.0 | 54.0 |
|  |  |  | a1-2 |  |  |  |  | 58.4 |  |  |  |  |  |
|  |  | Amorphous polyamide resin (a2) | a2-1 | 22.2 | 38.5 |  | 7.4 | 14.6 | 22.2 | 22.2 | 22.2 | 45.0 | 6.0 |
|  |  |  | a2-2 |  |  | 7.2 |  |  |  |  |  |  |  |
|  |  | Flame retardant (B) | B-1 | 26.0 | 23.0 | 28.0 | 26.0 | 27.0 | 26.0 | 26.0 | 26.0 | 10.0 | 40.0 |
|  |  |  | B-2 |  |  |  |  |  |  |  |  |  |  |
|  |  |  | B-3 |  |  |  |  |  |  |  |  |  |  |
|  | Glass fiber (C) |  | C-1 | 100 | 100 |  | 100 | 100 | 70 | 200 | 100 | 100 | 100 |
|  |  |  | C-2 |  |  | 100 |  |  |  |  |  |  |  |
|  | Antioxidant (D) |  | D-1 | 1 |  | 1 | 1 | 1 | 0.85 | 1.5 | 1 | 1 | 1 |
|  |  |  | D-2 |  | 1 |  |  |  |  |  |  |  |  |
|  |  |  | D-3 |  |  |  |  |  |  |  |  |  |  |
|  |  |  | D-4 |  |  |  |  |  |  |  |  |  |  |

TABLE 5-continued

| | | | Example | | | | | | | | | |
|---|---|---|---|---|---|---|---|---|---|---|---|---|
| | | | II-1 | II-2 | II-3 | II-4 | II-5 | II-6 | II-7 | II-8 | II-9 | II-10 |
| | Silicone oil (E) | E-1 | | | | | | | | 0.2 | | |
| | (a2)/(a1) + (a2) | | 0.3 | 0.5 | 0.1 | 0.1 | 0.2 | 0.3 | 0.3 | 0.3 | 0.5 | 0.1 |
| | (B-2)/(B) | | 0.00 | 0.00 | 0.00 | 0.00 | 0.00 | 0.00 | 0.00 | 0.00 | 0.00 | 0.00 |
| Properties | Running properties | | ○ | ○ | ○ | ○ | ○ | ○ | ○ | ○ | ○ | ○ |
| | Blending strength | MPa | 270 | 265 | 260 | 260 | 250 | 250 | 330 | 270 | 290 | 230 |
| | Blending modulus | GPa | 16.5 | 16 | 16 | 16 | 15.5 | 13 | 21 | 16.5 | 15.5 | 17 |
| | Flame retardance | | V-0 | V-0 | V-0 | V-1 | V-0 | V-0 | V-0 | V-0 | V-1 | V-0 |
| | Total afterflame time | second | 46 | 45 | 44 | 62 | 48 | 44 | 47 | 46 | 118 | 40 |
| | Release characteristics | | ◎ | ◎ | ◎ | ◎ | ◎ | ◎ | ◎ | ◎ | ◎ | ◎ |
| | Clogging of mold gas bent | | ○ | ○ | ○ | ○ | ○ | ○ | ○ | ○ | ○ | ○ |
| | Surface roughness | μm | 13 | 7 | 19 | 19 | 15 | 5 | 17 | 7 | 5 | 18 |
| | Blending modulus at weld region | GPa | 11.6 | 11.8 | 10.9 | 10.9 | 11.2 | 9.9 | 13.7 | 11.6 | 11.6 | 10.4 |
| | Retention rate of blending modulus | % | 70.3 | 73.8 | 68.1 | 68.1 | 72.3 | 76.2 | 65.2 | 70.3 | 74.8 | 61.2 |

TABLE 6

| | | | | Example | | | | | | | | | |
|---|---|---|---|---|---|---|---|---|---|---|---|---|---|
| | | | | II-11 | II-12 | II-13 | II-14 | II-15 | II-16 | II-17 | II-18 | II-19 | II-20 |
| Blending rate (parts by mass) | Polyamide resin/flame retardant | | | 100.0 | 100.0 | 100.0 | 100.0 | 100.0 | 100.0 | 100.0 | 100.0 | 100.0 | 100.0 |
| | Resin composition (percent by mass) | Crystalline polyamide resin (a1) | a1-1 | 51.8 | 51.8 | 51.8 | 51.8 | 51.8 | 38.5 | 64.8 | 51.8 | 51.8 | 52.5 |
| | | | a1-2 | | | | | | | | | | |
| | | Amorphous polyamide resin (a2) | a2-1 | 22.2 | 22.2 | 22.2 | 22.2 | 22.2 | 38.5 | | 22.2 | 22.2 | 22.5 |
| | | | a2-2 | | | | | | | 7.2 | | | |
| | | Flame retardant (B) | B-1 | 26.0 | 26.0 | 26.0 | 26.0 | 21.0 | 19.0 | 21.0 | 23.4 | 18.2 | 17.5 |
| | | | B-2 | | | | | 5.0 | 4.0 | 7.0 | 2.6 | 7.8 | 7.5 |
| | | | B-3 | | | | | | | | | | |
| | Glass fiber (C) | | C-1 | 100 | 100 | 100 | 100 | 100 | 100 | | 100 | 100 | 100 |
| | | | C-2 | | | | | | | 100 | | | |
| | Antioxidant (D) | | D-1 | 0.05 | 4 | | | 1 | | 1 | 1 | 1 | 1 |
| | | | D-2 | | | | | | 1 | | | | |
| | | | D-3 | | | 1 | 2 | | | | | | |
| | | | D-4 | | | | | | | | | | |
| | Silicone oil (E) | | E-1 | | | | | | | | | | |
| | (a2)/(a1) + (a2) | | | 0.3 | 0.3 | 0.3 | 0.3 | 0.3 | 0.5 | 0.1 | 0.3 | 0.3 | 0.3 |
| | (B-2)/(B) | | | 0.00 | 0.00 | 0.00 | 0.00 | 0.19 | 0.17 | 0.25 | 0.10 | 0.30 | 0.30 |
| Properties | Running properties | | | ○ | ○ | ○ | ○ | ○ | ○ | ○ | ○ | ○ | ○ |
| | Blending strength | MPa | | 270 | 270 | 255 | 260 | 270 | 265 | 260 | 270 | 270 | 280 |
| | Blending modulus | GPa | | 16.5 | 16.5 | 16 | 16.5 | 16.5 | 16 | 16 | 16.5 | 16.5 | 16.5 |
| | Flame retardance | | | V-0 | V-0 | V-0 | V-0 | V-0 | V-0 | V-0 | V-0 | V-0 | V-0 |
| | Total afterflame time | second | | 45 | 47 | 47 | 47 | 21 | 20 | 21 | 27 | 29 | 29 |
| | Release characteristics | | | ○ | ○ | ○ | ○ | ◎ | ◎ | ◎ | ◎ | ◎ | ◎ |
| | Clogging of mold gas bent | | | ○ | ○ | ○ | ○ | ○ | ○ | ○ | ○ | ○ | ○ |
| | Surface roughness | μm | | 16 | 13 | 19 | 16 | 13 | 7 | 19 | 13 | 13 | 12 |
| | Blending modulus at weld region | GPa | | 11.2 | 11.6 | 11.0 | 11.2 | 11.6 | 11.5 | 11.2 | 11.7 | 11.1 | 11.6 |
| | Retention rate of blending modulus | % | | 67.9 | 70.3 | 68.8 | 67.9 | 70.3 | 71.9 | 70.0 | 70.9 | 67.3 | 70.3 |

Comparative Examples II-1 to II-14

Pellets were prepared in a manner similar to Example II-1, except that the blending ratio of the components was changed as shown in Tables 7 and 8, and the various properties thereof were determined. The results are summarized in Tables 7 and 8.

TABLE 7

| | | | | Comparative Example | | | | | | | |
|---|---|---|---|---|---|---|---|---|---|---|---|
| | | | | II-1 | II-2 | II-3 | II-4 | II-5 | II-6 | II-7 | II-8 |
| Blending rate (parts by mass) | Polyamide resin/flame retardant | | | 100.0 | 100.0 | 100.0 | 100.0 | 100.0 | 100.0 | 100.0 | 100.0 |
| | Resin composition (percent by mass) | Crystalline polyamide resin (a1) | a1-1 | 51.8 | 42.0 | 51.8 | 51.8 | 51.8 | 70 | 30.8 | 73.6 |
| | | | a1-2 | | | | | | | | |

TABLE 7-continued

|  |  |  | Comparative Example | | | | | | | |
|---|---|---|---|---|---|---|---|---|---|---|
|  |  |  | II-1 | II-2 | II-3 | II-4 | II-5 | II-6 | II-7 | II-8 |
|  | Amorphous polyamide resin (a2) | a2-1 | 22.2 | 18.0 | 22.2 | 22.2 | 22.2 |  | 46.2 | 18.4 |
|  |  | a2-2 |  |  |  |  |  |  |  |  |
|  | Flame retardant (B) | B-1 |  |  | 21.0 |  | 13 | 30 | 23 | 8 |
|  |  | B-2 |  |  |  |  | 13 |  |  |  |
|  |  | B-3 | 26.0 | 40 | 5 |  |  |  |  |  |
|  |  | B-4 |  |  |  | 26.0 |  |  |  |  |
|  | Glass fiber (C) | C-1 | 100 | 100 | 100 | 100 | 100 | 100 | 100 | 100 |
|  |  | C-2 |  |  |  |  |  |  |  |  |
|  | Antioxidant (D) | D-1 | 1 | 1 | 1 | 1 | 1 | 1 | 1 | 1 |
|  |  | D-2 |  |  |  |  |  |  |  |  |
|  |  | D-4 |  |  |  |  |  |  |  |  |
|  | Releasing agent (F) | F-1 |  |  |  |  |  |  |  |  |
|  | (a2)/(a1) + (a2) |  | 0.3 | 0.3 | 0.3 | 0.3 | 0.3 | 0 | 0.6 | 0.2 |
|  | (B-2)/(B) |  | 0.00 | 0.00 | 0.00 | 0.00 | 0.5 | 0.00 | 0.00 | 0.00 |
| Properties | Running properties |  | ○ | ○ | ○ | X | X | ○ | X | ○ |
|  | Blending strength | MPa | 270 | 190 | 270 | A strand could not be extruded | A strand could not be extruded | 260 | 240 | 290 |
|  | Blending modulus | GPa | 16 | 15.5 | 16.5 |  |  | 16 | 15 | 15.5 |
|  | Flame retardance |  | V-not | V-not | V-not | | | V-0 | V-0 | V-not |
|  | Total afterflame time | second | >250 | >250 | >250 | | | 47 | 44 | >250 |
|  | Release characteristics |  | ○ | ○ | ○ |  |  | ○ | X | ○ |
|  | Clogging of mold gas bent |  | X | X | ○ |  |  | ○ | ○ | ○ |
|  | Surface roughness | μm | 19 | 25 | 13 |  |  | 52 | 9 | 16 |
|  | Blending modulus at weld region | GPa | 8.2 | 5.1 | 10.5 |  |  | 10.3 | 7.5 | 10.9 |
|  | Retention rate of blending modulus | % | 51.2 | 32.9 | 63.6 |  |  | 64.4 | 50 | 70.3 |

TABLE 8

|  |  |  |  | Comparative Example | | | Example | Comparative Example | | |
|---|---|---|---|---|---|---|---|---|---|---|
|  |  |  |  | II-9 | II-10 | II-11 | I-1 | II-12 | II-13 | II-14 |
| Blending rate (parts by mass) | Polyamide resin/flame retardant | | | 100.0 | 100.0 | 100.0 | 100.0 | 100.0 | 100.0 | 100.0 |
|  | Resin composition (percent by mass) | Crystalline polyamide resin (a1) | a1-1 | 49.5 | 51.8 | 51.8 | 51.8 | 51.8 | 51.8 | 51.8 |
|  |  |  | a1-2 |  |  |  |  |  |  |  |
|  |  | Amorphous polyamide resin (a2) | a2-1 | 5.5 | 22.2 | 22.2 | 22.2 | 22.2 | 22.2 | 22.2 |
|  |  |  | a2-2 |  |  |  |  |  |  |  |
|  |  | Flame retardant (B) | B-1 | 45 | 26.0 | 26.0 | 26.0 | 26.0 | 26.0 | 26.0 |
|  |  |  | B-2 |  |  |  |  |  |  |  |
|  |  |  | B-3 |  |  |  |  |  |  |  |
|  |  |  | B-4 |  |  |  |  |  |  |  |
|  | Glass fiber (C) |  | C-1 | 100 | 50 | 230 | 100 | 100 | 100 | 100 |
|  |  |  | C-2 |  |  |  |  |  |  |  |
|  | Antioxidant (D) |  | D-1 | 1 | 0.75 | 1.65 |  |  | 6 |  |
|  |  |  | D-2 |  |  |  |  |  |  |  |
|  |  |  | D-4 |  |  |  |  | 1 |  |  |
|  | Releasing agent (F) |  | F-1 |  |  |  |  |  |  | 1 |
|  | (a2)/(a1) + (a2) |  |  | 0.1 | 0.30 | 0.3 | 0.3 | 0.3 | 0.3 | 0.3 |
|  | (B-2)/(B) |  |  | 0.00 | 0.00 | 0.00 | 0.00 | 0.00 | 0.00 | 0.00 |
| Properties | Running properties |  |  | X | ○ | X | ○ | ○ | X | ○ |
|  | Blending strength | MPa |  | 190 | 205 | A strand could not be extruded | 270 | 270 | 240 | 245 |
|  | Blending modulus | GPa |  | 17 | 10.5 |  | 16.5 | 16.5 | 15.5 | 15.5 |
|  | Flame retardance |  |  | V-0 | V-0 | be | V-0 | V-not | V-0 | V-not |
|  | Total afterflame time | second |  | 19 | 30 | extruded | 46 | >250 | 45 | >250 |
|  | Release characteristics |  |  | ○ | ○ |  | ○ | Δ | ○ | ○ |
|  | Clogging of mold gas bent |  |  | ○ | ○ |  | ○ | Δ | ○ | ○ |
|  | Surface roughness | μm |  | 24 | 5 |  | 15 | 15 | 13 | 13 |
|  | Blending modulus at weld region | GPa |  | 8.7 | 6.9 |  | 9.2 | 8.8 | 10.1 | 10.3 |
|  | Retention rate of blending modulus | % |  | 51.2 | 65.7 |  | 55.8 | 53.3 | 65.2 | 66.5 |

The resin compositions of Examples II-1 to II-22 were excellent in running properties, mechanical properties, flame-retardant, release characteristics, resistance to gas vent clogging and surface roughness. The resin compositions of Examples II-1 to II-11 and II-16 to II-22, which contained a phosphorus-based antioxidant in an amount greater than that in Examples I-1 to I-18, were further improved in release characteristics.

The resin compositions of Comparative Examples II-1 to 3, which used a flame retardant melamine cyanurate outside the scope of the present invention, were poor in flame retardancy. Because the resin composition of Comparative Example II-4, used a flame retardant aluminum hydroxide outside the scope of the present invention, extrusion into strands during kneading could not be carried out and resin pellets could not be obtained. Because the resin composition of Comparative Example II-5 had a greater amount of melamine polyphosphate in the blending ratio of aluminum diethylphosphinate to melamine polyphosphate, extrusion of strands during kneading could not be carried out and resin pellets could not be obtained. The resin composition of Comparative Example II-6, which did not contain an amorphous polyamide, was poor in surface roughness. Because the resin composition of Comparative Example II-7 contained the amorphous polyamide in a greater amount, strands could not be cooled rapidly, resulting in making extrusion difficult and lowering running properties, and the composition in mold during injection molding could not be hardened in a short cycle, resulting in inferior release characteristics. The resin composition of Comparative Example II-8, which contained the flame retardant added in a smaller amount (i.e., which contained the polyamide resin in a greater amount), was low in flame-retarding properties. The resin composition of Comparative Example II-9 contained the flame retardant in a greater amount (i.e., contained the polyamide resin in a smaller amount), was brittle, resulting in being poor in running properties and bending strength. The resin composition of Comparative Example II-10, which contained the flattened glass fiber in a smaller amount, was poor in bending modulus. Because the resin composition of Comparative Example II-11 contained the flattened glass fiber in an excessively large amount, extrusion of strands during kneading could not be carried out and resin pellets could not be obtained. The resin composition of Comparative Example II-12, which used an antioxidant outside the scope of the present invention, was poor in flame retardancy, release characteristics, and resistance to gas vent clogging. The resin component of Comparative Example II-13, which contained the phosphorus-based antioxidant in a greater amount, was poor in running properties. The resin composition of Comparative Example II-14, which used a releasing agent outside the range of the present invention, was poor in flame retardancy.

The invention claimed is:

1. A flame-retardant glass fiber-reinforced polyamide resin composition, comprising:
   100 parts by mass of a flame-retardant resin composition consisting of
   (A) 72 to 90 percent by mass of a polyamide resin, and
   (B) 28 to 10 percent by mass of a flame retardant containing no halogen atom,
   (A)+(B) being 100 percent by mass;
   60 to 210 parts by mass of a flattened glass fiber (C) having an aspect ratio of 1.5-10, and
   0.85 to 1.5 parts by mass of a phosphorus-based antioxidant (D) having a pentaerythritol diphosphite skeleton and a molecular weight of 600 to 800,
   wherein the polyamide resin (A) consists of a crystalline aliphatic polyamide resin having a melting point of 160-265° C. selected from the group consisting of nylon 6, nylon 66, copolymeric polyamides of nylon 6 and nylon 66, and mixed polyamides of nylon 6 and nylon 66 (a1) and an amorphous polyamide resin (a2),
   the flame retardant containing no halogen atom (B) comprises a phosphinate (b1) and/or a diphosphinate (b2), and
   a blending ratio of the amorphous polyamide resin (a2) in the polyamide resin (A) is $0.1 \leq (a2)/(A) \leq 0.5$.

2. The flame-retardant glass fiber-reinforced polyamide resin composition of claim 1, wherein
   the blending ratio of the amorphous polyamide resin (a2) in the polyamide resin (A) is $0.4 \leq (a2)/(A) \leq 0.5$, and
   the ratio of the flame retardant containing no halogen atom (B) is from 10 to less than 24 percent by mass.

3. The flame-retardant glass fiber-reinforced polyamide resin composition of claim 1 or claim 2, wherein
   the flame retardant containing no halogen atom (B) comprises a phosphinate (b1) and/or a diphosphinate (b2), and a reaction product from phosphoric acid and melamine.

4. The flame-retardant glass fiber-reinforced polyamide resin composition of claim 1, wherein
   0.1 to 1 part by mass of a phosphorus-based antioxidant (D) is further contained with respect to 100 parts by mass of the flame-retardant resin composition ((A)+(B)=100 percent by mass).

5. The flame-retardant glass fiber-reinforced polyamide resin composition of claim 1, wherein
   0.05 to 1 part by mass of a silicone oil is further contained with respect to 100 parts by mass of the flame-retardant resin composition ((A)+(B)=100 percent by mass).

6. The flame-retardant glass fiber-reinforced polyamide resin composition of claim 1, wherein
   the phosphinate is represented by the following Formula (I), and the diphosphinate is represented by the following Formula (II):

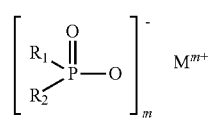

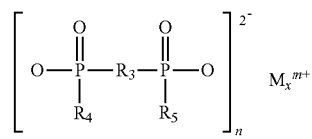

wherein $R^1$, $R^4$, $R^2$ and $R^5$ independently represent a straight- or branched-chain $C_1$ to $C_{16}$ alkyl, and $R^1$ and $R^2$, $R^4$ and $R^5$ may bind to each other to form a ring independently; $R^3$ represents a straight- or branched-chain $C_1$ to $C_{10}$ alkylene; M represents calcium atom or aluminum atom; m is 2 or 3; n is 1 or 3; and x is 1 or 2; mx=2n in Formula (II).

7. A molded article formed of the flame-retardant glass fiber-reinforced polyamide resin composition of claim 1.

8. A molded article formed of the flame-retardant glass fiber-reinforced polyamide resin composition of claim 2.

9. A molded article formed of the flame-retardant glass fiber-reinforced polyamide resin composition of claim 3.

10. A molded article formed of the flame-retardant glass fiber-reinforced polyamide resin composition of claim 4.

11. A molded article formed of the flame-retardant glass fiber-reinforced polyamide resin composition of claim 5.

12. A molded article formed of the flame-retardant glass fiber-reinforced polyamide resin composition of claim 6.

* * * * *